C. G. LEA.
Nut-Lock.

No. 216,870.  Patented June 24, 1879.

Attest:
Wm H. Morrell
R. K. Evans

Inventor:
Chas. G. Lea
by A. H. Evans & Co
his attys.

UNITED STATES PATENT OFFICE.

CHARLES G. LEA, OF ALTON, ILLINOIS.

IMPROVEMENT IN NUT-LOCKS.

Specification forming part of Letters Patent No. 216,870, dated June 24, 1879; application filed April 11, 1879.

*To all whom it may concern:*

Be it known that I, CHAS. G. LEA, of Alton, in the county of Madison and State of Illinois, have invented a new and Improved Combined Fish-Plate and Nut-Lock for Railroad-Rail Joints; and I hereby declare the following to be a full, clear, and exact description thereof, reference being had to the accompanying drawings, making part of this specification, in which—

Figure 1:
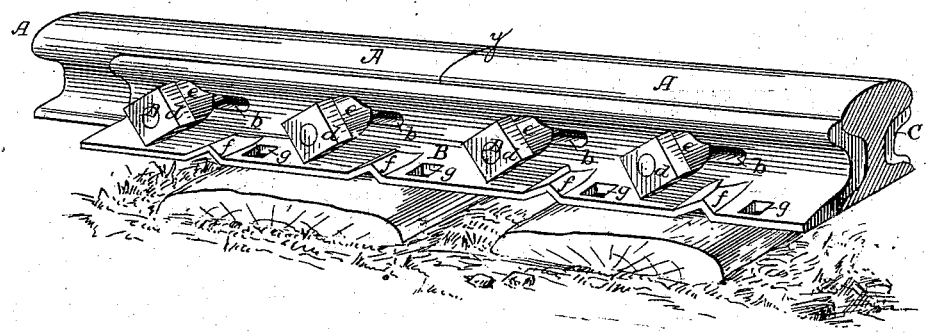
Figure 2:
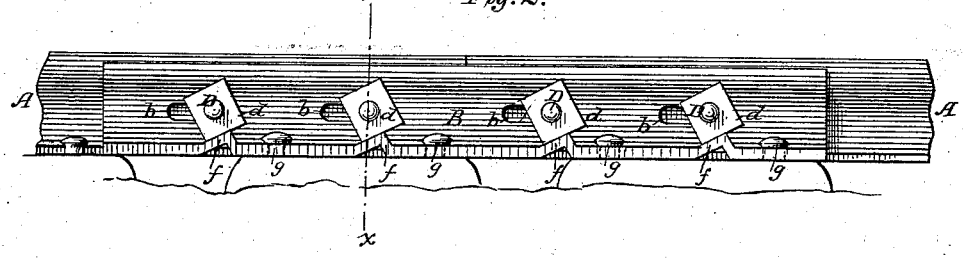
Figure 3:
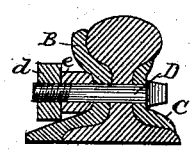

Figure 1 is a perspective view of my device applied to a rail-joint, the nuts being unlocked. Fig. 2 is a side elevation of the same, showing the nuts locked. Fig. 3 is a cross-sectional view on line $x$ $x$ of Fig. 2.

The object of my invention is to provide a means for locking the nuts of fish-plate bolts; and it consists in constructing the fish-plate with a series of angular projections equal in number to the bolts used, and a series of slots through which the bolts pass, so that after the nuts are screwed up into position the fish-plate can be driven longitudinally with the rail until the projections come in contact with the nuts. Spikes being driven through the flange of the fish-plate into the ties secure the fish-plate and hold the projections against the nuts and secure them.

In order that those skilled in the art may make and use my invention, I will proceed to describe the manner in which I have carried it out.

In the said drawings, A A are the ends of the rails brought together at $y$, and having the usual holes for the reception of the fish-plate bolts. The outside fish-plate, B, conforms to the shape of the rail, so as to lie against the web, and has a flange, F, extending out over the base of the rail. In the portion of the outer fish-plate lying contiguous to the web of the rail are a series of slots, $b$ $b$, corresponding in number to the bolt-holes in the rail ends, and in the edge of flange F are punched holes $g$ $g$ for the reception of spikes.

Struck up transverse to flange F are a series of angular projections, $f$ $f$, for a purpose hereinafter set forth. The inner fish-plate, C, is punched with holes to receive the bolts D, the heads of which rest against it. The nuts $d$ have interposed between them and the rail washers $e$, whose ends conform to the curvature of the rail. The length of these washers throws the nuts out from contact with the rail, and to a sufficient distance to insure a contact between the nuts $d$ and the projections $f$ when the fish-plate is in position to lock the nuts.

The locking operation is as follows: The fish-plate B is laid against the rail ends with the bolt-holes coincident with the end of the slots farthest from the projections $f$. The washers $e$ are passed over the bolts and the nuts $d$ screwed down. Then the device is in the position seen in Fig. 1.

By a proper tool or other means the outer fish-plate is then driven along the rail until the bolts reach the opposite ends of the slots $b$. This leaves one face of each nut resting against the faces of the angular projections, as seen in Fig. 2. Spikes are then driven through the holes $g$ into the ties to prevent the plate B from moving, and the nuts are then all securely locked.

Having thus described my invention, what I claim as new, and desire to secure by Letters Patent, is—

1. In a railroad-rail joint, the fish-plate B, provided with irregular projections $f$, to lock the bolt-nuts $d$, for the purpose described.

2. The rails A A and bolt D, in combination with plate C and plate B, provided with slots $b$, projections $f$, and holes $g$, substantially as and for the purpose described.

3. The bolts D, rails A A, plates B C, and nuts $d$, in combination with the elongated nut $e$, having one face corresponding in shape to the fish-plate, as described.

CHARLES G. LEA.

Witnesses:
 WM. D. HODGE,
 N. C. HATHEWAY.